(12) United States Patent
Kasahara et al.

(10) Patent No.: US 8,954,888 B2
(45) Date of Patent: Feb. 10, 2015

(54) INFORMATION PROCESSING APPARATUS, INFORMATION PROCESSING METHOD AND PROGRAM ASSOCIATED WITH A GRAPHICAL USER INTERFACE WITH PROXIMITY SENSOR TRIGGERED MENU OPTIONS

(75) Inventors: Shunichi Kasahara, Kanagawa (JP); Tomoya Narita, Kanagawa (JP); Ritsuko Kano, Tokyo (JP)

(73) Assignee: Sony Corporation, Tokyo (JP)

( * ) Notice: Subject to any disclaimer, the term of this patent is extended or adjusted under 35 U.S.C. 154(b) by 391 days.

(21) Appl. No.: 13/188,852

(22) Filed: Jul. 22, 2011

(65) Prior Publication Data

US 2012/0036479 A1    Feb. 9, 2012

(30) Foreign Application Priority Data

Aug. 4, 2010  (JP) ................. P2010-175636

(51) Int. Cl.
*G06F 3/048* (2013.01)
*G06F 3/0488* (2013.01)

(52) U.S. Cl.
CPC .................... *G06F 3/0488* (2013.01)
USPC ......................................... 715/825

(58) Field of Classification Search
CPC ............... G06F 3/0484; G06F 3/0482
See application file for complete search history.

(56) References Cited

U.S. PATENT DOCUMENTS

| | | | |
|---|---|---|---|
| 2007/0198949 A1* | 8/2007 | Rummel ...................... | 715/810 |
| 2008/0165131 A1* | 7/2008 | Kim et al. ..................... | 345/168 |
| 2008/0168403 A1* | 7/2008 | Westerman et al. .......... | 715/863 |
| 2009/0007012 A1* | 1/2009 | Mandic et al. ................ | 715/810 |
| 2009/0077504 A1* | 3/2009 | Bell et al. ...................... | 715/863 |
| 2009/0228828 A1* | 9/2009 | Beatty et al. .................. | 715/786 |
| 2009/0228841 A1* | 9/2009 | Hildreth ........................ | 715/863 |
| 2009/0303231 A1* | 12/2009 | Robinet et al. ............... | 345/419 |
| 2009/0327964 A1 | 12/2009 | Mouilleseaux et al. | |
| 2010/0050133 A1* | 2/2010 | Nishihara et al. ............ | 715/863 |
| 2010/0095206 A1* | 4/2010 | Kim .............................. | 715/702 |
| 2010/0107099 A1* | 4/2010 | Frazier et al. ................. | 715/765 |
| 2010/0115455 A1* | 5/2010 | Kim .............................. | 715/781 |
| 2010/0138782 A1* | 6/2010 | Rainisto ....................... | 715/808 |
| 2010/0149109 A1* | 6/2010 | Elias ............................. | 345/173 |
| 2010/0229125 A1* | 9/2010 | Cha .............................. | 715/828 |
| 2010/0235786 A1* | 9/2010 | Maizels et al. ............... | 715/810 |
| 2011/0016390 A1* | 1/2011 | Oh et al. ....................... | 715/702 |
| 2011/0179376 A1* | 7/2011 | Berestov et al. ............. | 715/779 |
| 2011/0285636 A1* | 11/2011 | Howard et al. ............... | 345/173 |
| 2011/0320969 A1* | 12/2011 | Hwang et al. ................ | 715/765 |
| 2012/0268410 A1* | 10/2012 | King et al. .................... | 345/173 |

FOREIGN PATENT DOCUMENTS

| | | |
|---|---|---|
| JP | 07-200126 | 8/1995 |
| JP | 09-230831 | 9/1997 |

(Continued)

OTHER PUBLICATIONS

Feb. 12, 2014, JP communication issued for related JP application No. 2010-175636.

*Primary Examiner* — Omar Abdul-Ali
*Assistant Examiner* — Haimei Jiang
(74) *Attorney, Agent, or Firm* — Sherr & Jiang, PLLC

(57) ABSTRACT

The present disclosure provides an electronic device, the device including, processor, a display, and an interface configured to, detect non-contact proximity of an operation member, determine whether the member is within a first selection region corresponding to a first selection object; and display a second selection object adjacent to the first selection object when it is determined that the member is within the first selection region.

22 Claims, 19 Drawing Sheets

(56) References Cited

FOREIGN PATENT DOCUMENTS

| | | |
|---|---|---|
| JP | 2000-242385 | 9/2000 |
| JP | 2006-236143 | 9/2006 |
| JP | 2008-65730 | 3/2008 |
| JP | 2008-152441 | 7/2008 |
| JP | 2008-250620 | 10/2008 |
| JP | 2009-075656 | 4/2009 |
| WO | WO2008/010278 A1 | 1/2008 |
| WO | WO2010/013876 A1 | 2/2010 |

* cited by examiner

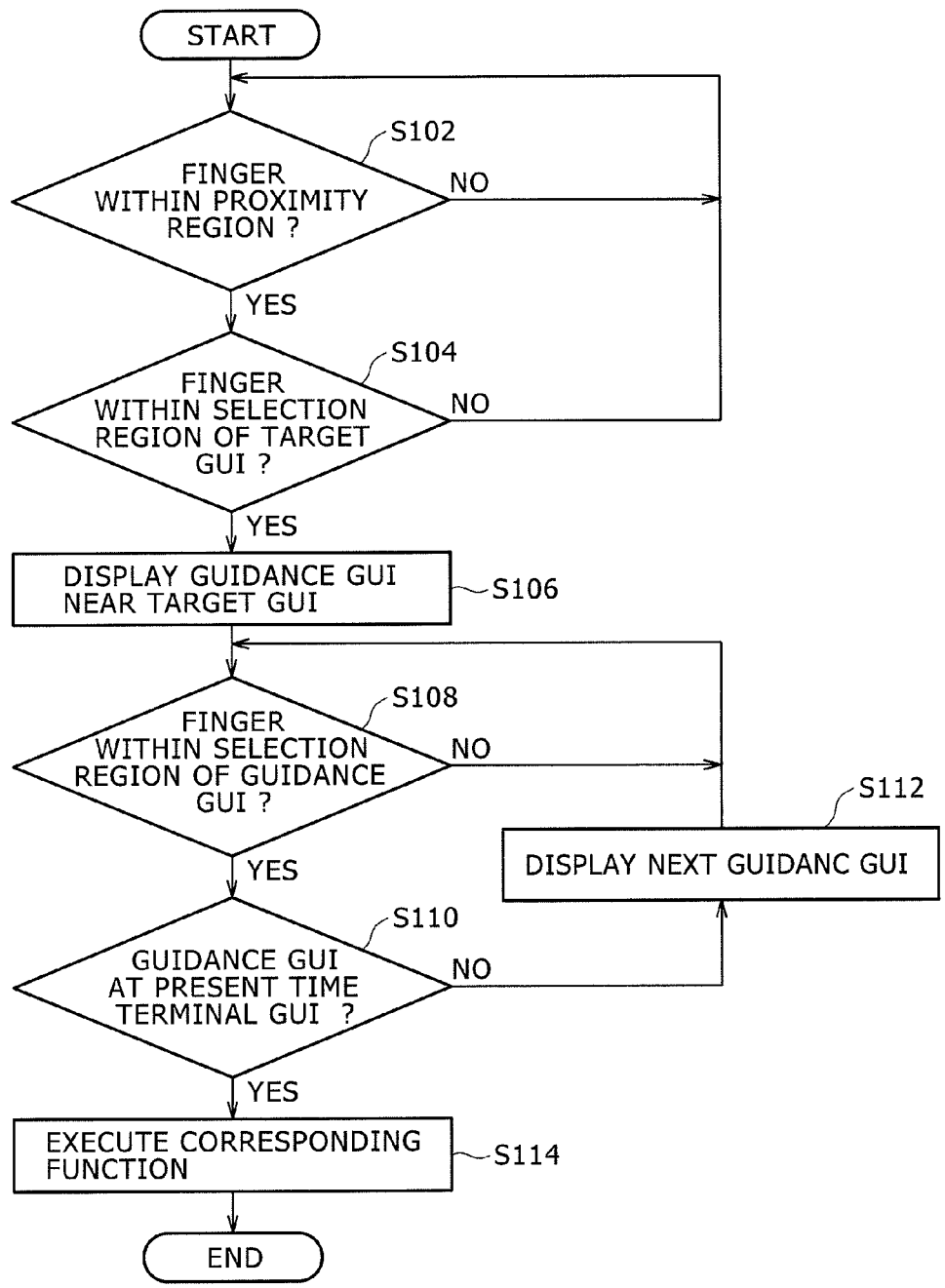

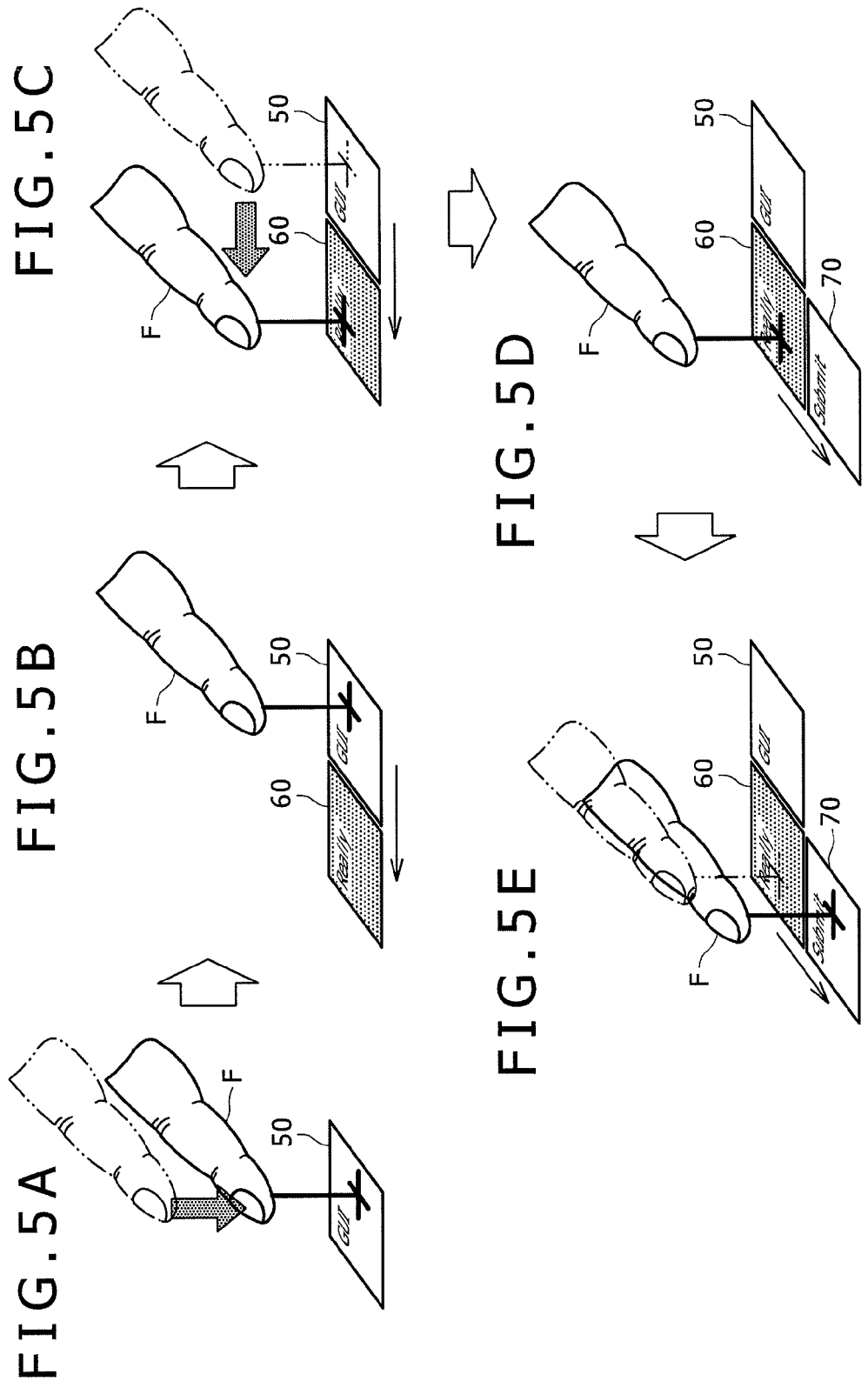

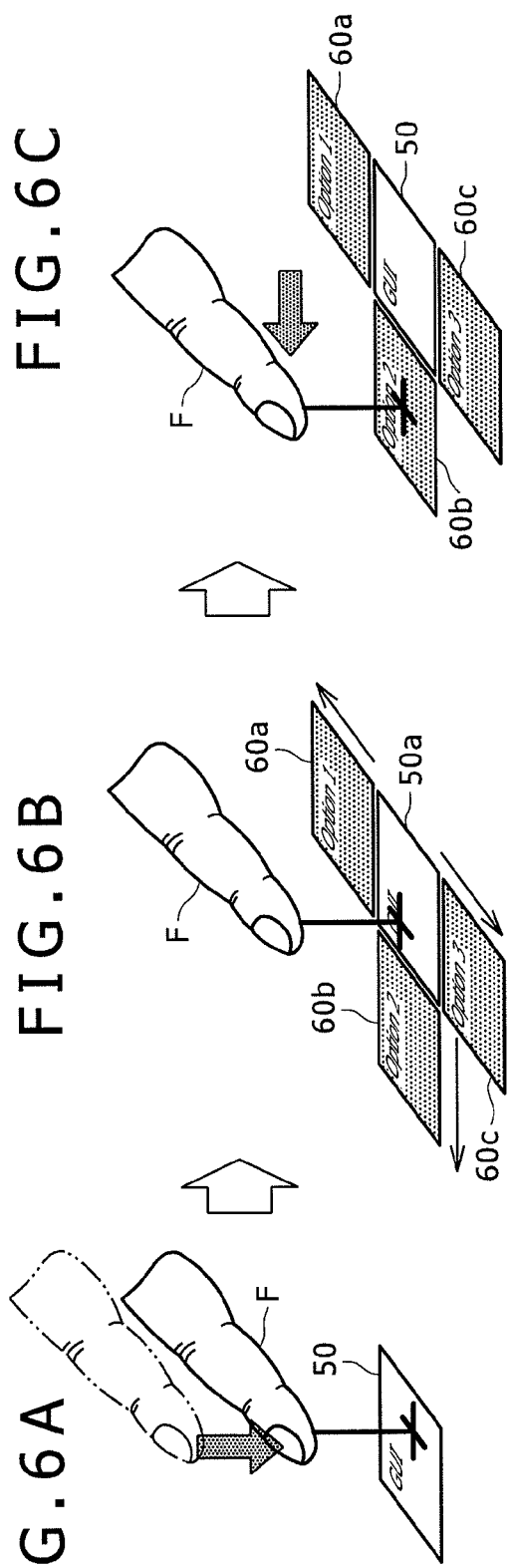

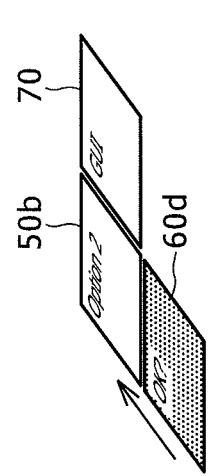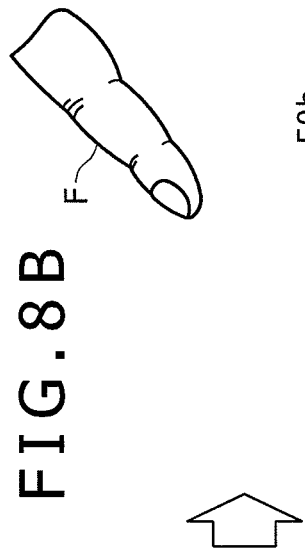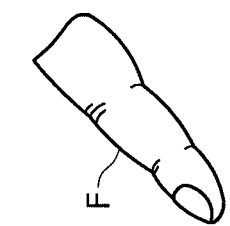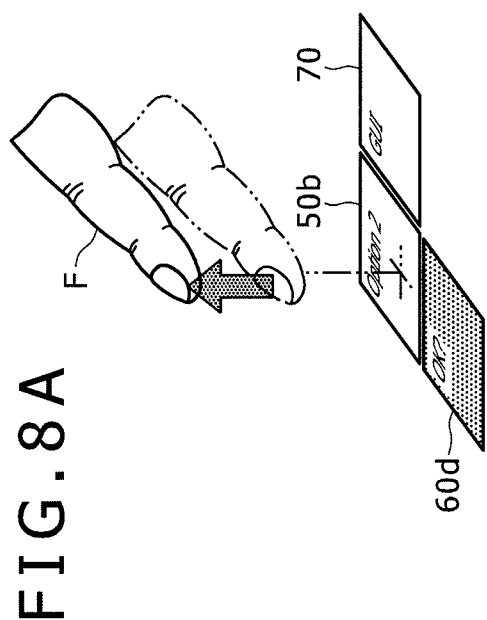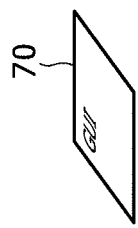
FIG.8A  FIG.8B  FIG.8C  FIG.8D FIG.21
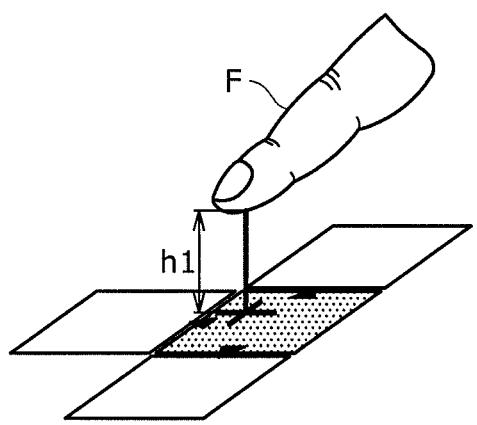
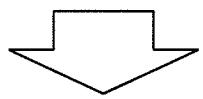
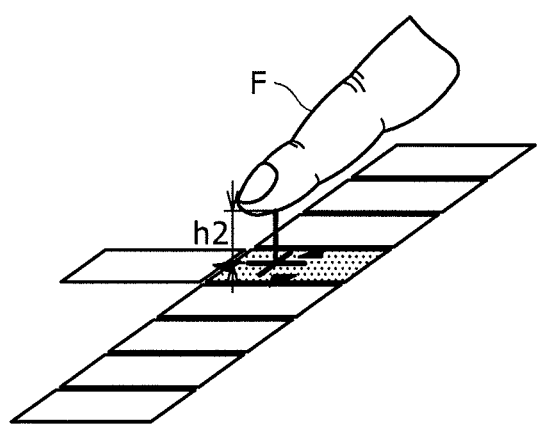

INFORMATION PROCESSING APPARATUS, INFORMATION PROCESSING METHOD AND PROGRAM ASSOCIATED WITH A GRAPHICAL USER INTERFACE WITH PROXIMITY SENSOR TRIGGERED MENU OPTIONS

BACKGROUND

This disclosure relates to an information processing apparatus, an information processing method and a program.

A graphical user interface (GUI) is a user interface wherein computer graphics and a pointing device are used. A user can carry out various inputting operations by carrying out an operation for a graphic image displayed on a screen using the pointing device. Since the GUI makes an intuitive operation possible, it has spread widely at present.

The user can cause an intended function to be executed by using the pointing device to carry out an execution determination operation for an object representative of a desired function among graphic objects representative of different functions. The execution determination operation by the pointing device is usually carried out, for example, in the case where the pointing device is a mouse, by operating the mouse to move a cursor to a target object and clicking the object. On the other hand, in the case where the pointing device is a touch screen, the execution determination operation is usually carried out by touching a position on the touch screen, at which a target object is displayed, with a finger.

On the other hand, in recent years, a coordinate inputting apparatus as a kind of pointing device has been proposed and is disclosed, for example, in Japanese Patent Laid-Open No. 2008-65730 wherein the position of a finger in a non-contacting state above a touch screen is detected.

SUMMARY

For example, in the case of a GUI operation using the pointing device which can be operated in a non-contacting condition, a GUI may be used which executes a predetermined function by movement of the pointing position in place of a clicking operation by a mouse and a touching operation with a touch screen in the past. However, in this instance, if a predetermined function is executed simply by detecting that the pointing position is moved to a graphic object representative of the function, then the possibility of malfunction increases, resulting the possibility that the operability may be deteriorated.

Therefore, it is desirable to provide a novel and improved information processing apparatus, information processing method and computer program by which the possibility of malfunction when a predetermined function is to be executed by movement of a pointing position can be reduced.

Disclosed is a device. The device may include a processor. The device may also include a display. The device may further include an interface. The interface may be configured to detect non-contact proximity of an operation member. The interface may be further configured to determine whether the member is within a first selection region corresponding to a first selection object. The interface may also be configured to display a second selection object adjacent to the first selection object when it is determined that the member is within the first selection region.

Also disclosed is a computer-implemented method. The method may include detecting non-contact proximity of an operation member. The method may also include determining whether the member is within a first selection region corresponding to a first selection object. The method may further include displaying a second selection object adjacent to the first selection object when it is determined that the member is within the first selection region. Also disclosed is a tangibly embodied computer-readable storage medium including instructions that, when executed by a processor, perform a method. The method may include detecting non-contact proximity of an operation member. The method may also include determining whether the member is within a first selection region corresponding to a first selection object. The method may further include displaying a second selection object adjacent to the first selection object when it is determined that the member is within the first selection. In summary, with the information processing apparatus, information processing method, and program, the possibility of malfunction when a predetermined function is executed by movement of the pointing apparatus may be reduced.

BRIEF DESCRIPTION OF THE DRAWINGS

FIG. 4 is a flow chart illustrating a first example of working of the information processing apparatus;

FIGS. 5A to 5E are schematic views illustrating an example of an operation and object display;

FIGS. 6A to 6E are schematic views illustrating an example of an operation and object display in the case where a plurality of choices appear;

FIGS. 8A to 8D are schematic views illustrating another example of a cancellation operation and object display;

FIG. 21 is a schematic view illustrating an example of display according to the distance between an operation screen and an operating body.

DETAILED DESCRIPTION OF THE PREFERRED EMBODIMENT

Figure 1:
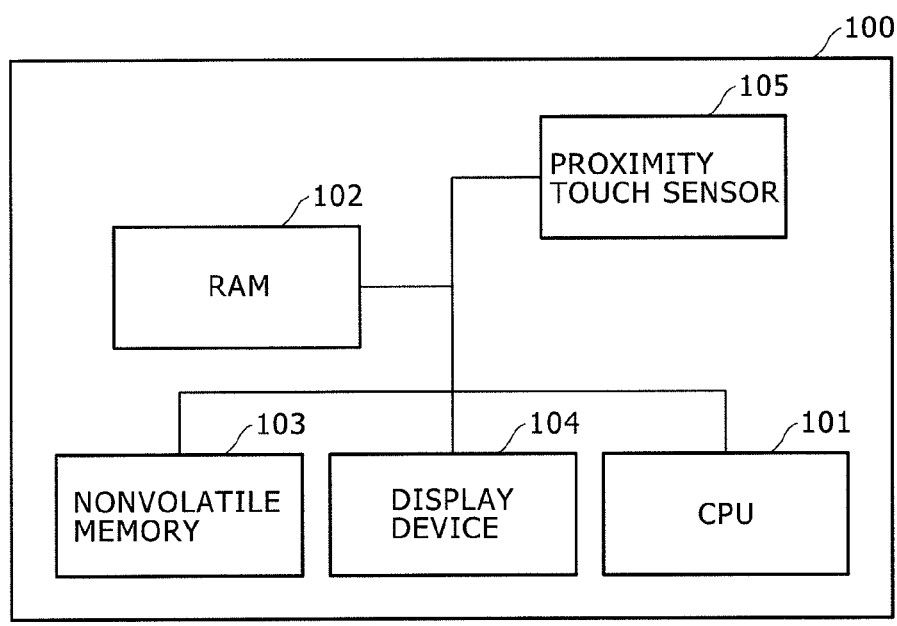
FIG. 1 is a block diagram showing an example of a hardware configuration of an information processing apparatus according to an embodiment of the disclosure.

In the following, a preferred embodiment of the present disclosure is described in detail with reference to the accompanying drawings. It is to be noted that, in the specification and the accompanying drawings, substantially like parts or elements having substantially like functional configurations are denoted by like reference characters, and overlapping description of the same is omitted herein to avoid redundancy.

It is to be noted that the description is given in the following order:

1. Outline of the Information Processing Apparatus
2. Functional Configuration of the Information Processing Apparatus
3. First example of working
4. Second example of working <1. Outline of the Information Processing Apparatus>

[Hardware Configuration of the Information Processing Apparatus]

First, a hardware configuration of an information processing apparatus according to an embodiment of the disclosure is described with reference to FIGS. 1 and 2.

Referring particularly to FIG. 1, the information processing apparatus 100 according to the present embodiment includes a central processing unit (CPU) 101, a random access memory (RAM) 102, a nonvolatile memory 103, a display device 104 and a proximity touch sensor 105.

The information processing apparatus 100 includes a detection unit which can detect a contact position of an operating body placed on a display face of a display device. The detection unit can further detect a proximity distance between the display face of the display device and an operating body positioned above the display face. The information processing apparatus 100 may have various forms such as a personal computer (PC), a personal digital assistant (PDA), a game machine for home use, a home appliance or the like. Or, the information processing apparatus 100 may be an information processing apparatus such as a portable telephone set, a Personal Handy-phone System (PHS) terminal, a portable music player, a portable video processing apparatus or a portable game machine.

The CPU 101 functions as an arithmetic processing unit and a control apparatus and controls general operation of the components of the information processing apparatus 100 in accordance with various programs. The CPU 101 may be a microprocessor. The RAM 102 temporarily stores programs to be used in execution of the CPU 101 and parameters and so forth which suitably vary in the execution. The CPU 101 and the RAM 102 are connected to each other by a host bus configured from a CPU bus or the like. The nonvolatile memory 103 stores programs, calculation parameters and so forth to be used by the CPU 101. The nonvolatile memory 103 can be formed using, for example, a read only memory (ROM), a flash memory or the like.

The display device 104 is an example of an outputting apparatus which outputs information. The display device 104 may be configured using, for example, a liquid crystal display (LCD) apparatus, an organic light emitting diode (OLED) apparatus or the like. The proximity touch sensor 105 is an example of an inputting apparatus used by a user to input information and is configured from an inputting section for inputting information, an inputting control circuit for producing an input signal based on an input by the user and outputting the input signal to the CPU 101, and so forth.

Figure 2:
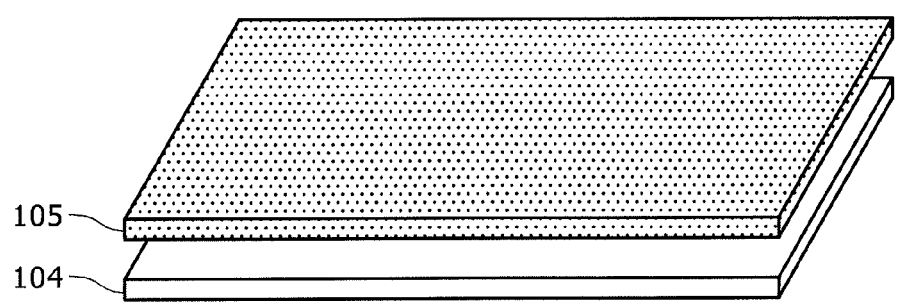
FIG. 2 is a schematic view showing an example of a hardware configuration of the information processing apparatus.

The proximity touch sensor 105 is a position detection apparatus provided in an overlapping relationship on the display device 104 as seen in FIG. 2 and adapted to detect the position of an operating body with respect to the display screen of the display device 104. The operating body, that is, an operation member, is typically a user's finger, a stylus, or the like, and the user inputs operation information with it. A touch screen in the past cannot input operation information if it is not contacted at the display face thereof. Therefore, the touch screen in the past has problems that the display face is soiled and that, in the case where the nail of a finger is long or in a like case, the touch screen cannot be operated readily and may possibly be damaged. In contrast, the proximity touch sensor 105 can detect the position of an operating body which is positioned spaced above the display face, that is, in non-contact proximity to the display face. At this time, the proximity touch sensor 105 has a detection region within which it can detect the position of the operating body. This detection region is hereinafter referred to as proximity region. The user can input operation information by carrying out various gestures for a graphic object displayed on the display screen of the display device 104 within the proximity region.

In a GUI, in response to operation information for a graphic object representative of a predetermined function, control for executing the function is carried out as described hereinabove. Usually, in order to execute a desired function, a "click operation" for a graphic object representative of the function by means of a mouse or a "touch operation" of touching with the position on the graphic object on the touch screen is carried out.

In the case where operation information is inputted without contacting with the display face, the detection region of operation information is greater than that by a touch screen of the contact type. Therefore, if execution of a function is carried out simply by detection of an operating body on a graphic object representative of a desired function, then there is the possibility that the information processing apparatus 100 may malfunction frequently. Therefore, in the present embodiment, in order to prevent such malfunction, display of a graphic object on the display screen for causing the function to be executed and action carried out in response to operation information of an operating body for the display screen are controlled.

Before a particular example of such control is described, a functional configuration of the information processing apparatus 100 is described. It is to be noted that, while the information processing apparatus 100 according to the present embodiment is described below as an apparatus which has the configuration described above, the present disclosure is not limited to this example. For example, the information processing apparatus 100 may be configured otherwise such that an inputting device or devices which can carry out a pointing operation and a click operation for information displayed on the display device or on a different apparatus such as a mouse are connected to and used together with the information processing apparatus 100. However, in the case where the proximity touch sensor 105 which can detect a proximity distance between the display face and a finger as in the present embodiment is used, also a movement of a finger in a three-dimensional space can be detected and a variety of operation inputs can be carried out. Or, the information processing apparatus 100 may be of a different type which can detect a contact position of an operating body with the display face and a pressure of pushing in of the display face by an operating body.

<2. Functional Configuration of the Information Processing Apparatus>

Figure 3:
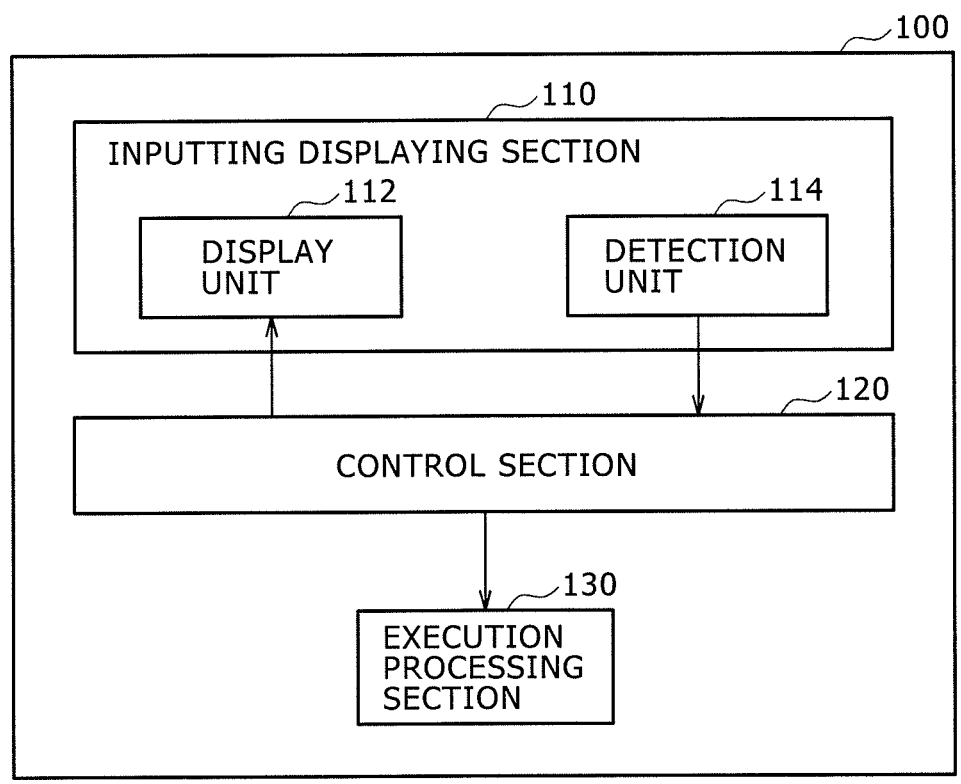
FIG. 3 is a block diagram showing an example of a functional configuration of the information processing apparatus.

Now, a functional configuration of the information processing apparatus 100 according to the present embodiment is described with reference to FIG. 3. The information processing apparatus 100 includes an inputting displaying section 110, a control section 120 and an execution processing section 130.

The inputting displaying section 110 is a functioning section for displaying information and inputting information, and includes a display unit 112 and a detection unit 114. The display unit 112 has a functional configuration corresponding to that of the display device 104 shown FIG. 1 and provides a display screen image to a user under the control of the control section 120. The detection unit 114 has a functional configuration corresponding to that of the proximity touch sensor 105 shown in FIG. 1 and can be configured using, for example, a touch sensor of the electrostatic type. The detection unit 114 has a function of detecting the position of an operating body with respect to the display screen of the display unit 112 in a non-contacting condition. Further, if it is determined that the display screen lies in a plane defined by an x axis and a y axis, then the detection unit 114 has a function of detecting the (x, y) position in the plane. Furthermore, the detection unit 114 may further detect the distance from the display screen in a z axis direction which is a perpendicular direction to the x axis and the y axis. The detection unit 114 inputs a detected position of an operating body to the control section 120.

The control section 120 has a function of controlling working of the entire information processing apparatus 100. The control section 120 controls the content of a display screen image to be displayed on the display unit 112 based mainly on a result of detection inputted from the detection unit 114. Further, if the control section 120 acquires operation information of a user for the display screen image from the detection unit 114, then it decides based on the operation information whether or not each function can be executed to control working of the execution processing section 130. The execution processing section 130 is a functioning section for carrying out an execution process of various functions under the control of the control section 120.

The control section 120 of the information processing apparatus 100 according to the present embodiment causes objects, which include a function object associated with a predetermined function and an execution object associated with an execution process of the function, to be displayed on an operation screen. At this time, the control section 120 causes the objects to be displayed on the operation screen such that objects associated with an object pointed to by an operating body are successively expanded. Then, if it is detected that the position of the operating body moves from the function object to an execution object, then the control section 120 controls the execution processing section 130 to execute the function.

An information processing method of the information processing apparatus 100 is described in connection with two examples. First, a first example of working regarding an operation for a single function object is described with reference to FIGS. 4 to 15, and then a second example of working regarding an operation for a list of function objects is described with reference to FIGS. 16 to 21.

<3. First Example of Working>

FIG. 4 illustrates the first example of working of the information processing apparatus 100. The first example of working relates to an operation for a single function object and object display in this instance.

Referring to FIG. 4, the detection unit 114 of the information processing apparatus 100 first decides at step S102 whether or not it is detected that a finger as an operating body is positioned within the proximity region, that is, detecting the proximity of an operating member. Then, if it is detected that a finger is positioned within the proximity region, then the detection unit 114 decides at step S104 whether or not the finger is positioned within a selection region corresponding to a target GUI, that is, a selection object.

The target GUI is a function object representative of a predetermined function which the information processing apparatus 100 has. At step S104, it is decided whether or not an operation for the target object displayed on the display screen is carried out. Further, the selection region of the target GUI is a region corresponding to a shape and a display position of the target GUI, and if it is detected that the operating body exists in the selection region, then operation information representative of selection of the target GUI is inputted.

If it is detected at step S104 that the finger is positioned in the selection region of the target GUI, then the control section 120 causes a guidance GUI, that is, a guidance object, to be displayed in the proximity of the target GUI at step S106. Then, the detection unit 114 decides at step S108 whether or not the finger is positioned in the selection region of the guidance GUI. If it is detected at step S108 that the finger is positioned in the selection region of the guidance GUI, then the control section 120 decides at step S110 whether or not the guidance GUI at the present point of time is a terminal GUI, that is, an execution object.

The terminal GUI is a GUI which does not have another GUI for next change and is an execution object. In other words, if the guidance GUI at the present point of time is not a terminal GUI, then since it has another GUI for next change, the control section 120 causes the next guidance GUI to be displayed at step S112. Then, the processing returns to step S108. On the other hand, if the guidance GUI at the present point of time is a terminal GUI at step S110, then the control section 120 causes a function associated with the GUI to be executed at step S114.

Now, an example of an operation of a user and object display is described with reference to FIGS. 5A to 15. FIGS. 5A to 5E illustrate an example of an operation and object display.

First, if the finger F which is an operating body enters the selection region of a function object 50 as seen in FIG. 5A, then the control section 120 causes a guidance object 60 to be displayed at a position adjacent the function object 50 as seen in FIG. 5B. The guidance object 60 is a kind of object and urges the user to move the proximity position of the finger F. In the example of FIGS. 5A to 5E, the guidance object 60 is an object for confirming whether or not execution of the function associated with the function object 50 may be determined really.

It is to be noted that the selection region here is a region for the object within which it can be detected that the object is selected. The selection region preferably corresponds to a shape of the object on the operation screen and may be a region within which the distance between the operation screen and the operating body can be detected.

Then, if the finger F is positioned within the selection region of the guidance object 60 as seen in FIG. 5C, then the control section 120 now causes an execution object 70 to be displayed at a position adjacent the guidance object 60 as seen in FIG. 5D. Then, if it is detected by the detection unit 114 that the finger F is positioned within the selection region of the execution object 70 as seen in FIG. 5E, then the control section 120 controls the execution processing section 130 to execute the function associated with the function object 50.

In this manner, with the information processing apparatus 100 according to the present embodiment, it can be caused to execute various functions thereof by movement of the position of an operating body without the necessity for a "touch operation" or a "click operation" for the screen. At this time, together with the function object associated with the predetermined function, an execution object associated with an execution process of the function is displayed. Then, if the change of the position of the operating member from the selection region corresponding to the function object to the selection region corresponding to the execution object is detected by the detection unit 114, then the control section 120 causes an execution process of the function associated with the execution object to be carried out.

It is to be noted that, while it is described above that one guidance object 60 is displayed between a function object 50 and an execution object 70, the present disclosure is not limited to this example. For example, another guidance object 60 may be displayed at a position adjacent the guidance object 60.

FIGS. 6A to 6D illustrate an example of an operation and object display regarding an example wherein a plurality of guidance objects are displayed. Different from the example of FIGS. 5A to 5E, in the example of FIGS. 6A to 6E, a plurality of guidance objects 60, particularly 60a, 60b and 60c, are displayed from one function object 50 as seen in FIG. 6B. The guidance objects 60 indicate a plurality of choices regarding functions associated with the function object 50. While, in the example of FIGS. 6A to 6E, the example wherein three guidance objects positioned adjacent three sides of the function object 50 which is indicated by a quadrangle are displayed is shown, the present disclosure is not limited to this example. For example, guidance objects 60 may be displayed otherwise adjacent all sides of the function object 50.

If it is detected that the finger F enters the selection region of the guidance object 60b as seen in FIG. 6C from the state illustrated in FIG. 6B, then working similar to that in the example described hereinabove with reference to FIGS. 5A to 5E is carried out. In response to detection of positioning of the finger F in the selection region of the guidance object 60b, an execution object 70 is displayed. Further, if it is detected that the finger F is positioned in the selection region of the execution object 70, then a function associated with the execution object 70 is executed.

Figure 7A:
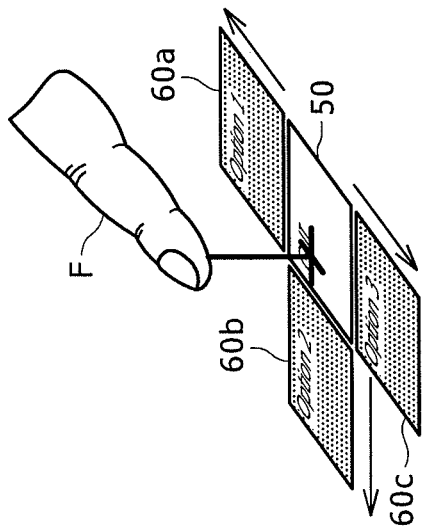
FIGS. 7A and 7B are schematic views illustrating an example of a cancellation operation and object display.
Figure 7B:
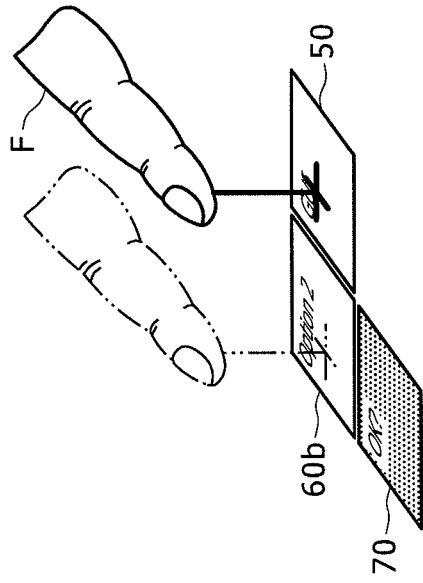

FIGS. 7A to 8D illustrate display examples upon cancellation operation of developing or unfolding display of objects. In particular, FIGS. 7A and 7B illustrate an example of a cancellation operation and object display, and FIGS. 8A to 8D illustrate another example of a cancellation operation and object display.

FIG. 7A illustrate a state in the case where a cancellation operation of returning the finger F to the function object 50 is carried out from the state of FIG. 6D. If an operation of returning to the function object 50 is carried out after the finger F moves from the selection region of the function object 50 to the selection region of the guidance object 60b and the execution object 70 is displayed, then the control section 120 carries out control to erase the display of the execution object. In particular, the control section 120 causes working, which is reverse to the working upon unfolding display from the guidance object 60b, to be carried out so as to fold back to the guidance object 60b. Thereafter, if it is detected that the position of the finger F remains in the selection region of the function object 50, then the control section 120 causes the guidance objects 60 to be displayed again.

FIGS. 8A to 8D illustrate working when the finger F moves in an upward direction from the state of FIG. 6D to the selection region of the guidance object 60b and then to a position displaced from the proximity region of the guidance object 60b. At this time, the control section 120 causes the display of the objects to be erased by successive folding operation in the order reverse to that when the displayed objects were successively displayed. For example, in a state of FIG. 8A, the execution object 70 is folded such that it is slidably moved and contained below the guidance object 60b, and then the guidance object 60 is folded similarly such that it is slidably moved and contained below the function object 50.

At this time, the speed of the working when each object is folded, that is, the speed at which each object is slidably contained below another object, may be lower than that of the working when it is displayed in an unfolded manner, that is, the speed at which it slidably moves from another object. For example, if it is detected that, after the finger F is displaced from the proximity region and an unfolding working of objects is started, the finger F enters the proximity region again intermediately of the unfolding operation, then the unfolding display working may be carried out again. At this time, the folding speed is preferably such that the user can confirm a manner of the movement by visual observation and can resume unfolding display at a desired timing. With such a configuration as just described, if the user removes its finger from the proximity region once, then the displayed objects are successively folded slowly toward the original state. Then, the user can return the display of the objects to a state from which an operation is to be re-carried out by positioning the finger in the proximity of an object at a desired timing.

Now, examples wherein the display position of an object to be displayed with respect to an object pointed to by a finger F is controlled based on arrangement of a plurality of function objects 50 are described with reference to FIGS. 9 and 10.

Figure 9:
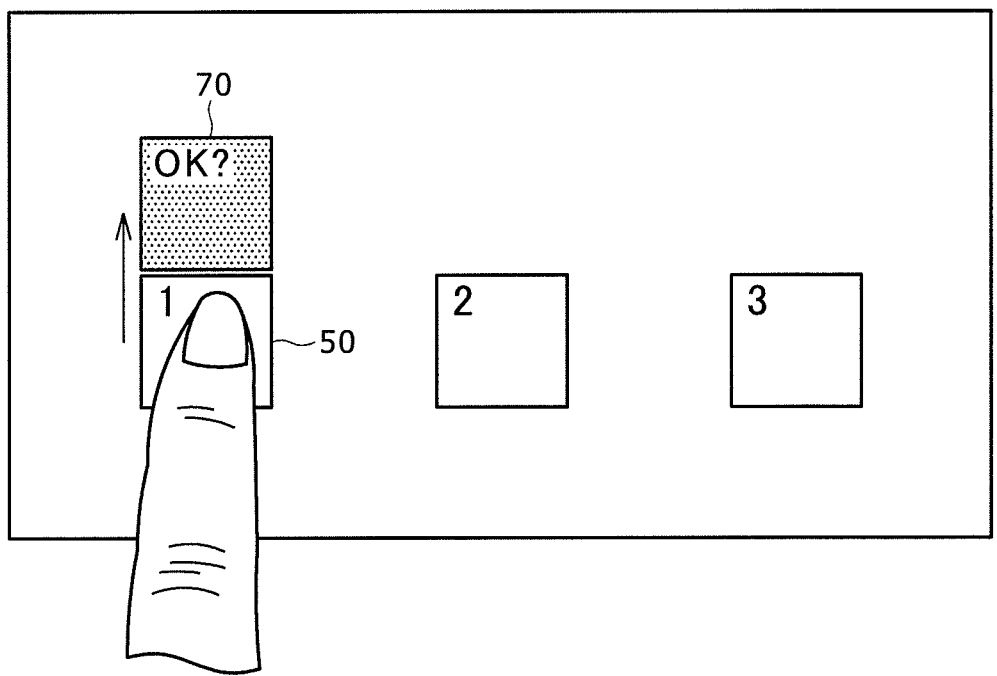
FIGS. 9 and 10 are schematic views illustrating different examples of a relationship between the position of an operating body and the position of a guidance object.

FIG. 9 shows three function objects 50 arranged in a horizontally spaced relationship from each other. Further, in the proximity of that one of the function objects 50 which is pointed to by the finger F, an execution object 70 is displayed in such a manner that it is slidably moved from the pointed function object 50. Thus, FIG. 9 particularly illustrates the display position of the execution object 70 with respect to the pointed function object 50.

In the case where a plurality of function objects 50 are arranged in a horizontally direction, that is, aligned in a horizontal direction, as seen in FIG. 9, preferably the execution object 70 appears in a direction perpendicular to the array of the function objects 50. For example, the execution object 70 is displayed above a function object 50. At this time, although the execution object 70 may be displayed below a function object 50, since the possibility that the execution object 70 may be hidden from the eye point of the user by the finger F, the execution object 70 is displayed preferably above the function object 50.

Figure 10:
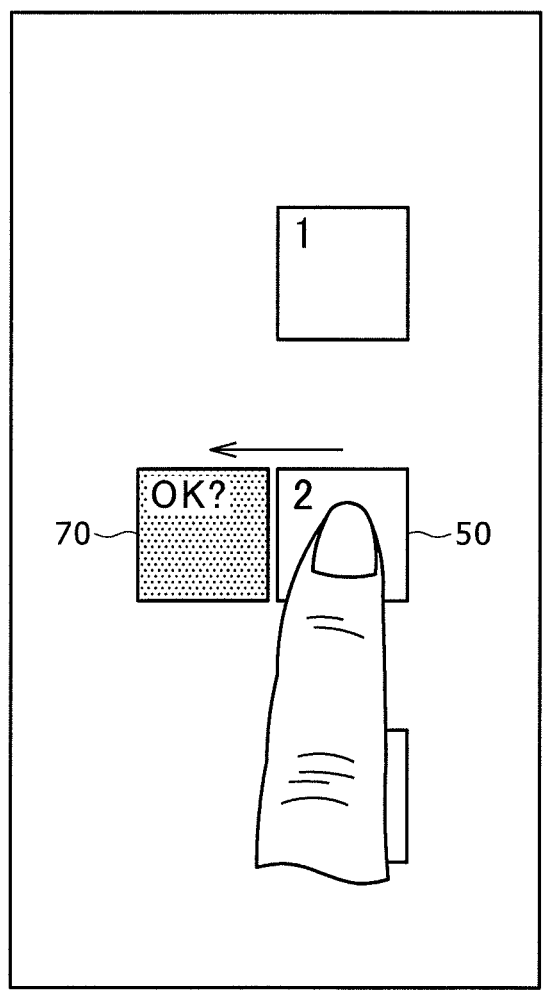

Meanwhile, FIG. 10 shows three function objects 50 arranged in a fixedly spaced relationship from each other in a vertical direction. Further, in the proximity of that one of the function objects 50 which is pointed to by the finger F, an execution object 70 is displayed such that it slidably moves from the pointed function object 50. Thus, FIG. 10 particularly illustrates the display position of the execution object 70 with respect to the pointed function object 50.

In the case where a plurality of function objects 50 are arranged in a vertical direction, that is, aligned in a vertical direction, as seen in FIG. 10, the execution object 70 appears preferably in a direction perpendicular to the array of the function objects 50. In particular, the execution object 70 is displayed in the rightward direction or the leftward direction with respect to the function object 50.

Alternatively, the control section 120 may control the display position of objects based on a movement history of the pointing position of the finger F as seen in FIGS. 11A to 11C, 12 and 13A to 13C. FIGS. 11A to 11C, 12 and 13A to 13C illustrate different examples of the relationship between the locus of movement of an operating body and the display position of objects.

Figure 11A:
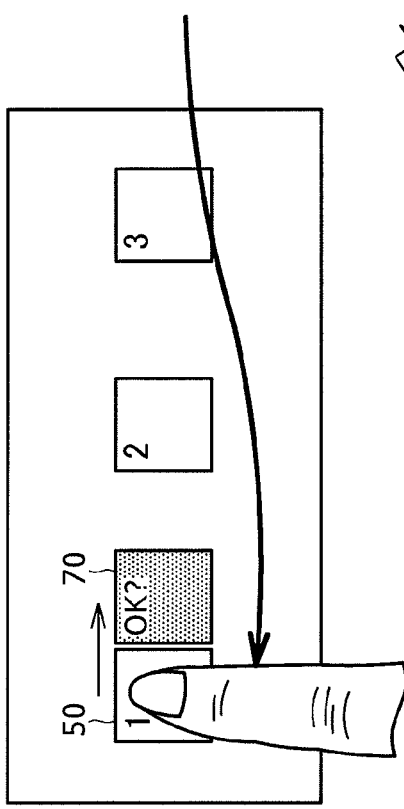
FIGS. 11A to 11C are schematic views illustrating an example of a relationship between the locus of movement of an operating body and the display position of an object.
Figure 11B:
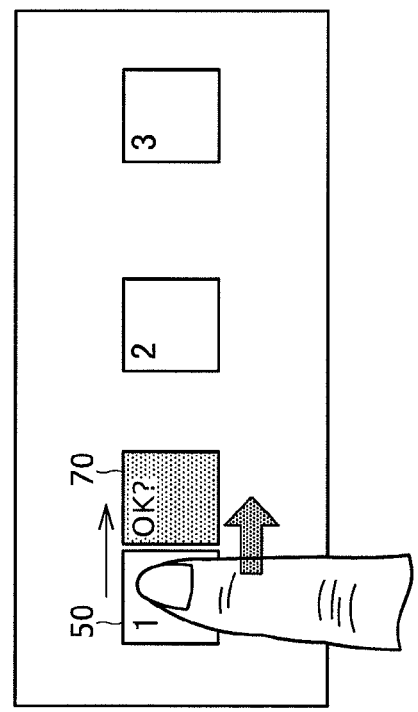
Figure 11C:
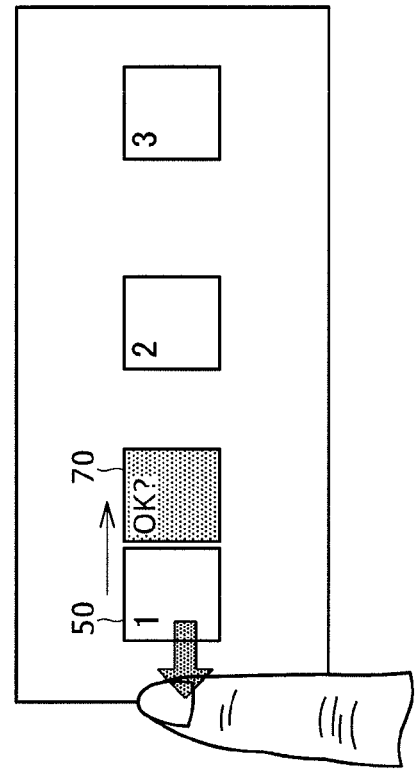

In the case where, after the finger F moves from the right side toward a selection region of a function object 50 which is to make a target of an operation as seen in FIG. 11A, it points to the function object 50, preferably the execution object 70 is displayed on the right side of the function object 50. For example, in this instance, in order for the user to carry out an execution process of a function associated with the function object 50, it is forced to change, after the function object 50 is pointed to, the direction of the movement of the finger F to move the finger F rightwardly as seen in FIG. 11B. Also in the case where the finger F having moved from the right to the left moves, after it points to the function object 50, excessively to the left by its own power, if the execution object 70 is displayed on the right side of the function object 50, then the possibility that an execution process of a function may be carried out in error is reduced favorably.

Figure 12:
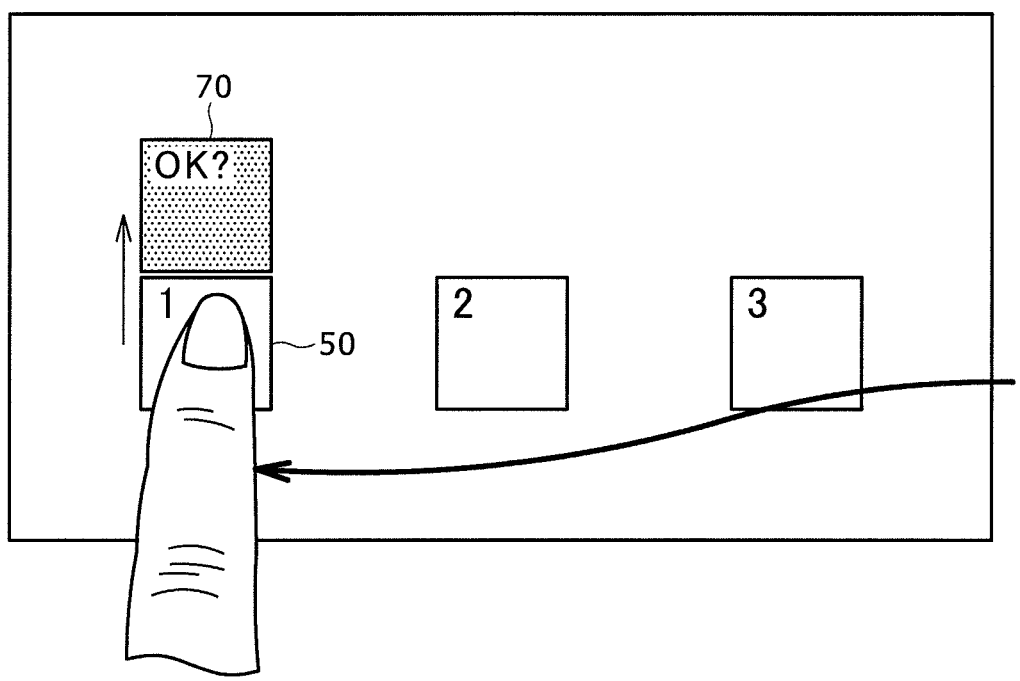
FIG. 12 is a schematic view illustrating another example of the relationship between the locus of movement of the operating body and the display position of an object.

It is to be noted that the execution object 70 may otherwise be displayed above the function object 50 as seen in FIG. 12. Also in this instance, in order to move the finger F to the selection region of the execution object 70 after it points to the function object 50, it is forced to change the moving direction of the finger F. Therefore, the possibility of malfunction is reduced.

Figure 13A:
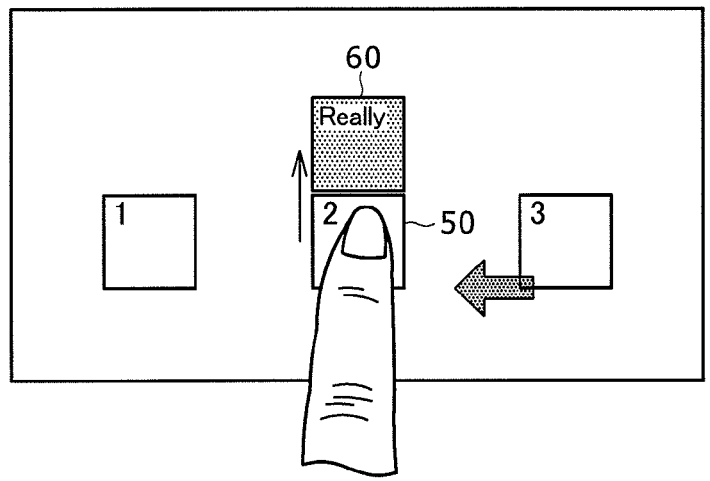
FIGS. 13A to 13C are schematic views illustrating a further example of the relationship between the locus of movement of the operating body and the display position of an object.
Figure 13B:
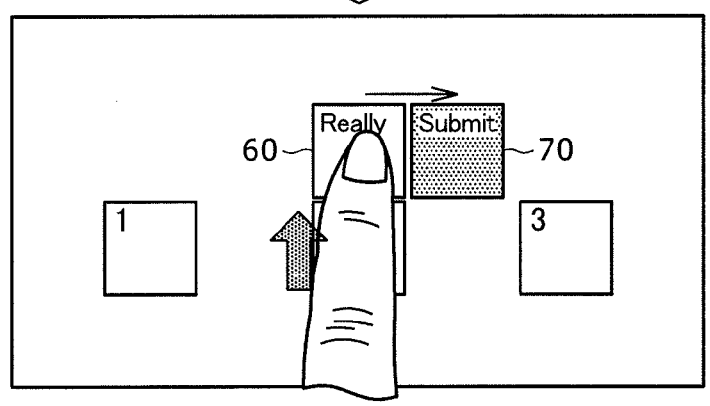
Figure 13C:
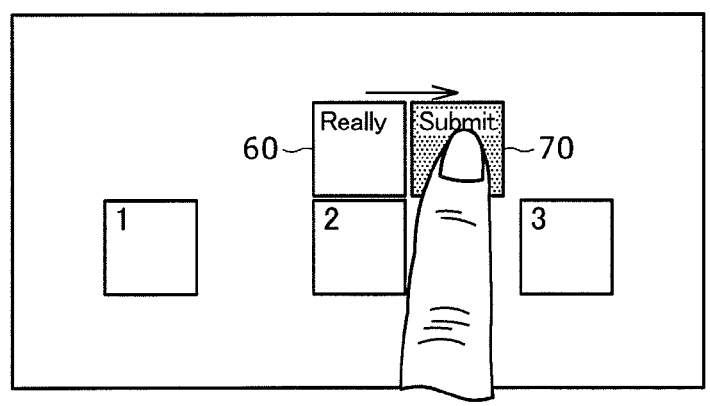

Now, the display position of an execution object 70 in the case where, when a function object 50 is pointed to, a guidance object 60 is displayed from the pointed function object 50 and then, when the guidance object 60 is pointed to, the execution object 70 is displayed as illustrated in FIGS. 13A to 13C is described. At this time, the display position of the execution object 70 is controlled based on a history of the approach angle of the finger F to the function object 50 and the guidance object 60.

Referring to FIG. 13A, the finger F moves in a leftward direction from the right side of a function object 50 and points to the function object 50. In this instance, if the guidance object 60 is displayed above the guidance object 60, then the execution object 70 to be displayed subsequently is preferably displayed on the right side of the guidance object 60. In other words, each object is preferably displayed at a position for which a greater change of the moving direction is forced to carry out a selection operation from the locus of movement of the finger F.

Figure 14:
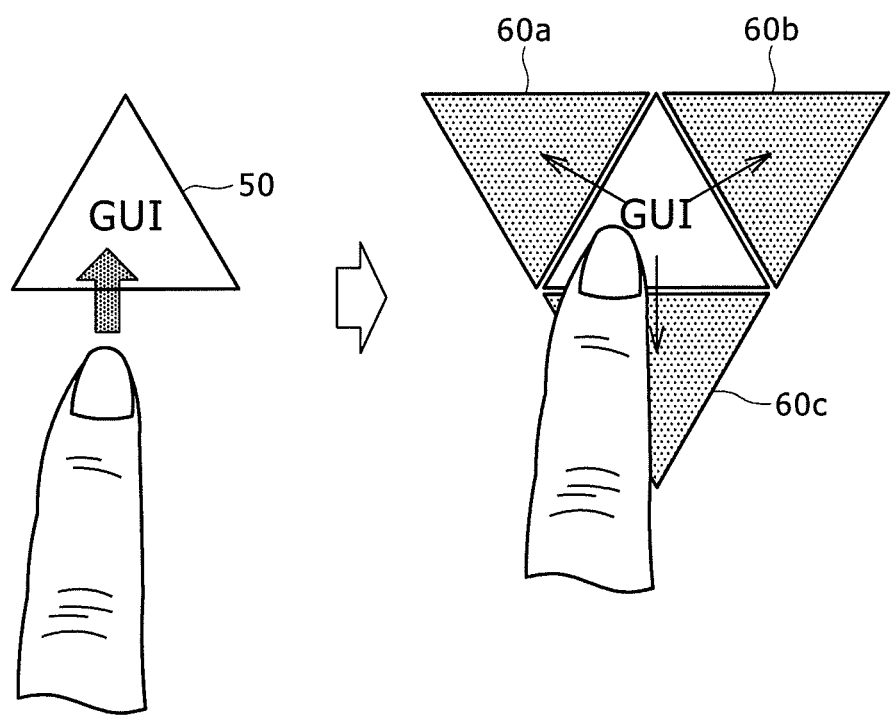
FIGS. 14 and 15 are schematic views illustrating different examples of the shape and the arrangement of objects.

It is to be noted that, while, in the foregoing description, each object has a quadrangular shape, the present disclosure is not limited to this example. For example, in the case where a function object 50 is represented by a triangular shape as seen in FIG. 14, guidance objects 60 may have triangular shapes individually displayed adjacent the three sides of the function object 50.

Figure 15:
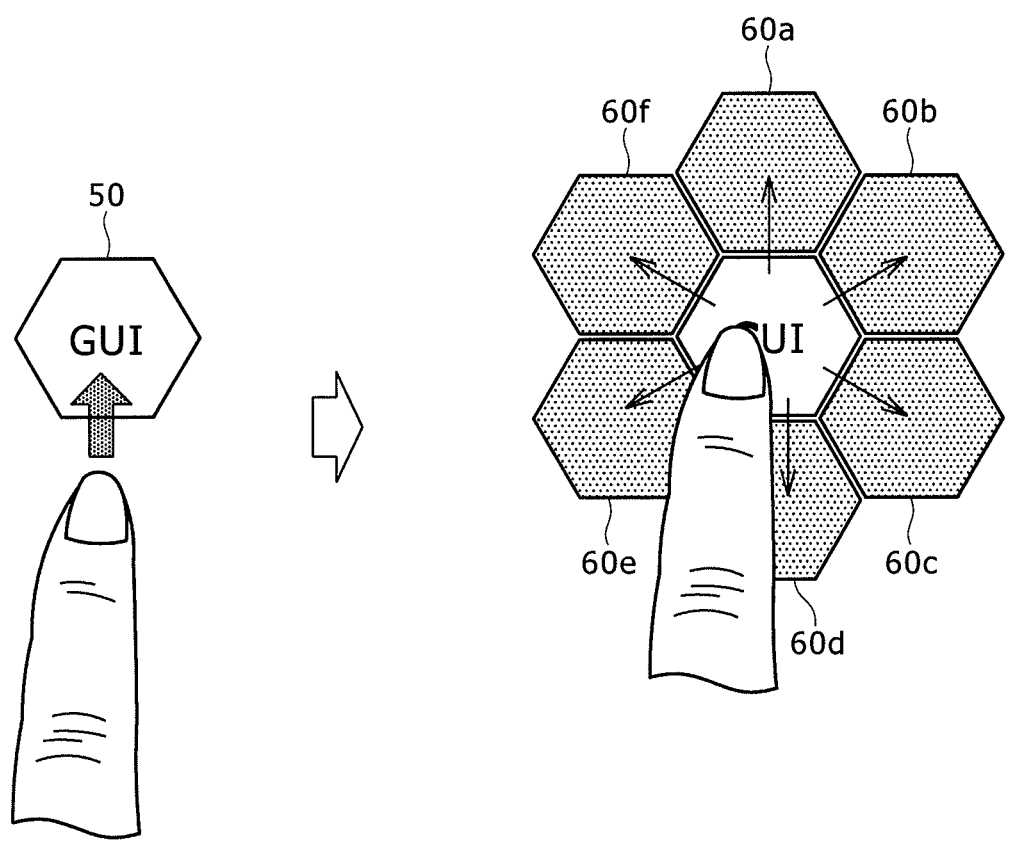

Or, in the case where a function object 50 is represented in a hexagonal shape as seen in FIG. 15, guidance objects 60 may have hexagonal shapes displayed adjacent the six sides of the function object 50.

<4. Second Example of Working>

Figure 16:
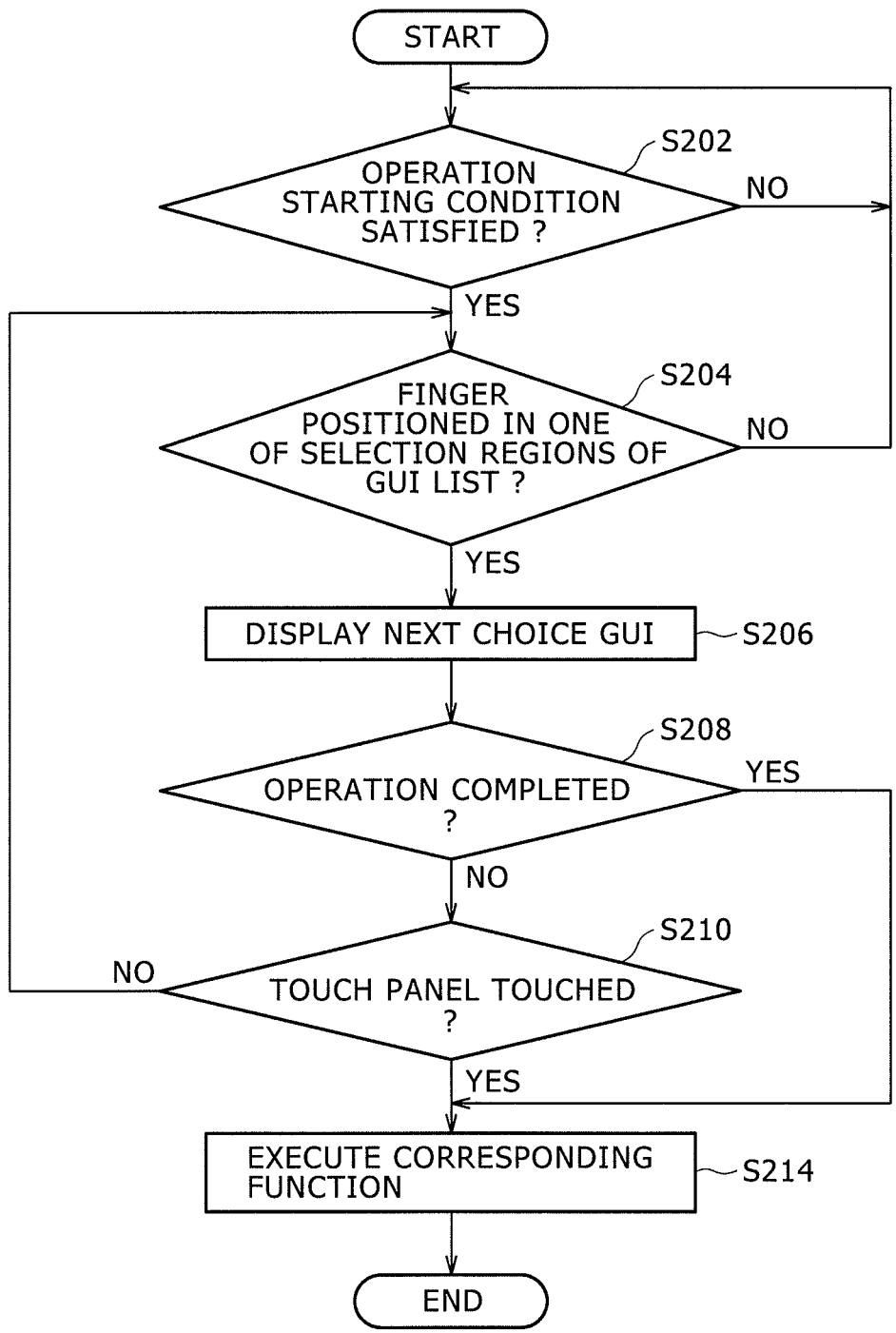
FIG. 16 is a flow chart illustrating a second example of working of the information processing apparatus.

Now, a second example of working of the information processing apparatus 100 is described. FIG. 16 illustrates the second example of working of the information processing apparatus 100. The second example of working relates to an operation for a plurality of function objects displayed in the form of a list and object display then as described hereinabove.

Referring to FIG. 16, first at step S202, the control section 120 of the information processing apparatus 100 decides based on a state of a finger as an operating body detected by the detection unit 114 whether or not an operation starting condition is satisfied. The operation starting condition at this time may be, for example, "a finger is detected in the proximity region of the screen," "a finger is detected in a region set specifically in advance in the proximity region" or "the amount of movement of a finger detected within the proximity region is smaller than a fixed level."

If it is decided by the decision at step S202 that the operation starting condition is satisfied, then the control section 120 decides, at step S204, based on a result of the detection of the detection unit 114, whether or not the finger is positioned in one of selection regions of a GUI list. Here, the GUI list is a plurality of function objects arrayed in a list. If it is detected by the decision at step S204 that the finger is positioned in one of the selection regions of the GUI list, that is, in the selection region of one of the function objects which configure the GUI list, then the control section 120 causes a next choice GUI to be displayed at step S206. The choice GUI displayed here may be a list of choices associated with the pointed function object or an execution object for the function object.

Then at step S208, the control section 120 decides based on a result of the detection of the detection unit 114 whether or not the operation is completed. For example, if an execution object is displayed and the finger is positioned in the selection region of the displayed execution object, then it is decided that the operation is completed.

If it is decided at step S208 that the operation is not completed, then it is decided whether or not a contact with the touch panel is detected at step S210. In the case where it is decided at step S208 that the operation is completed or it is decided at step S210 that a contact with the touch panel is detected, then an execution process of a corresponding function, that is, an execution process of a function associated with the function object selected from within the GUI list, is executed.

On the other hand, if it is not decided at step S208 that the operation is completed and then it is decided at step S210 that no contact with the touch panel is detected, then the processing returns to the operation at step S204. Consequently, a next choice GUI is displayed in response to the operation of the finger, and similar processes to those described above are executed until after the predetermined conditions are satisfied at steps S208 and S210.

Now, examples of an operation of a user and object display in the second example of working of the information processing apparatus 100 are described with reference to FIGS. 17A to 21.

Figure 17A:
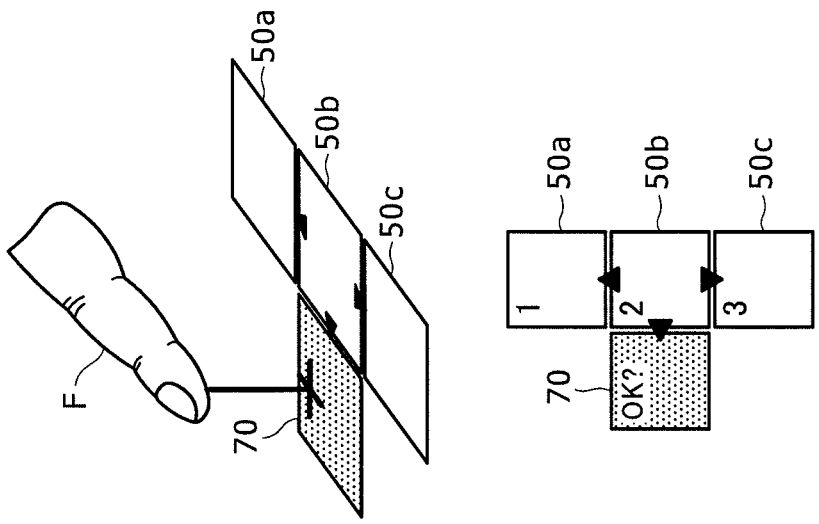
FIGS. 17A and 17B are schematic views illustrating an example of an operation for a list of function objects.
Figure 17B:
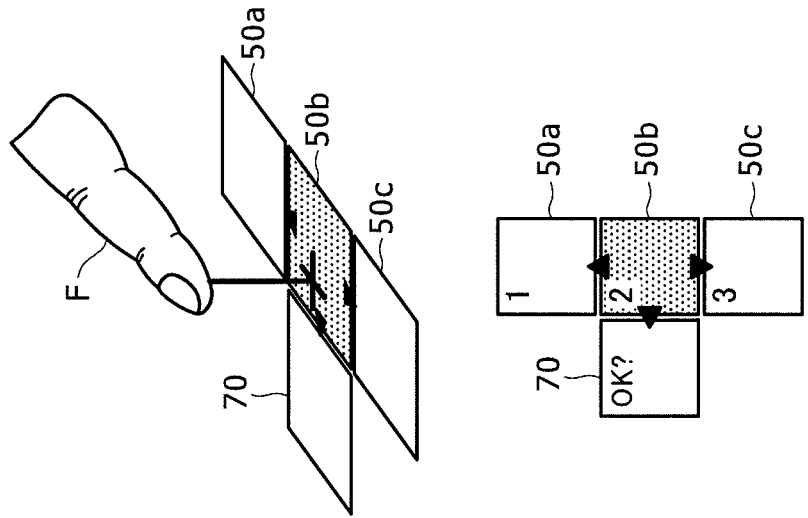

FIGS. 17A and 17B illustrate an example of an operation for a list of function objects. In FIG. 17A, a GUI of the list type in which three function objects 50*a*, 50*b* and 50*c* are arrayed is shown, and a user points to the function object 50*b* using a finger F thereof. In response to the pointing, a choice object to which the position of the finger F can be changed from the pointed function object 50*b* is displayed. In the example of FIG. 17A, the choice object is an execution object associated with an execution process of the function object 50*b*.

Then, if it is detected that the finger F is positioned in the selection region of the execution object 70 as seen in FIG. 17B, then the control section 120 causes the execution process of the function associated with the execution object 70 to be executed.

Figure 18B:
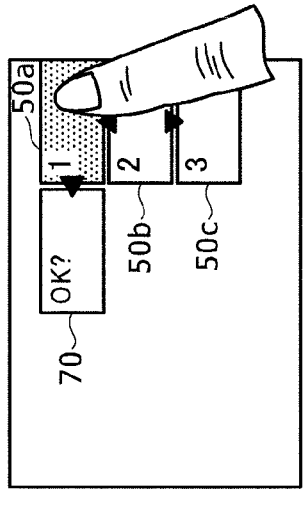
FIGS. 18A to 18D are schematic views illustrating another example of an operation for a list of function objects.
Figure 18C:
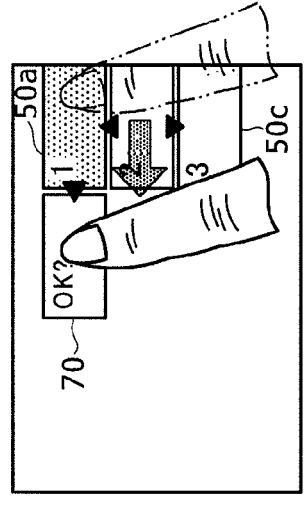
Figure 18A:
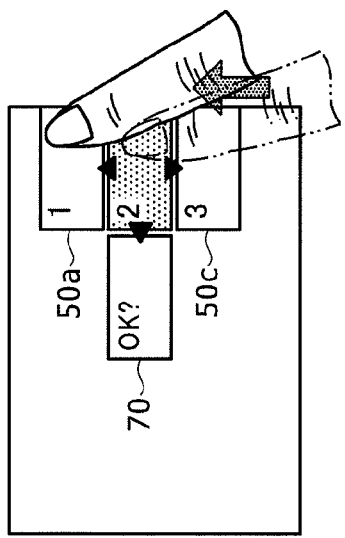

FIGS. 18A to 18D illustrate an example of working in the case where the finger F exhibits a different behavior on an operation screen similar to that of FIGS. 17A and 17B. For example, if the finger F pointing to the function object 50*b* moves into the selection region of the function object 50*a* as seen in FIG. 18A, then the function object 50*a* is pointed to and an execution object 70 corresponding to the function object 50*a* is displayed.

Figure 18D:
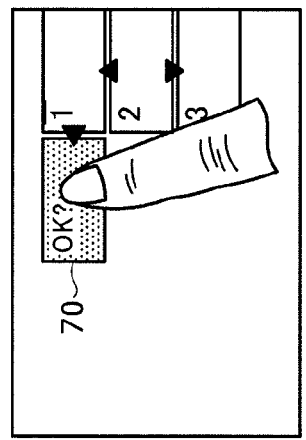

Then, if the finger F moves from the selection region of the function object 50*a* into the selection region of the execution object 70 as seen in FIG. 18C and the execution object 70 is pointed to as seen in FIG. 18D, then the control section 120 controls the execution processing section 130 to carry out an execution process of a function associated with the function object 50*a*.

It is to be noted that, while the foregoing description is directed to control based on a non-contacting operation of the proximity touch sensor, the information processing apparatus 100 can further enhance the operability by combination of this non-contacting operation with a contacting operation.

Figure 19:
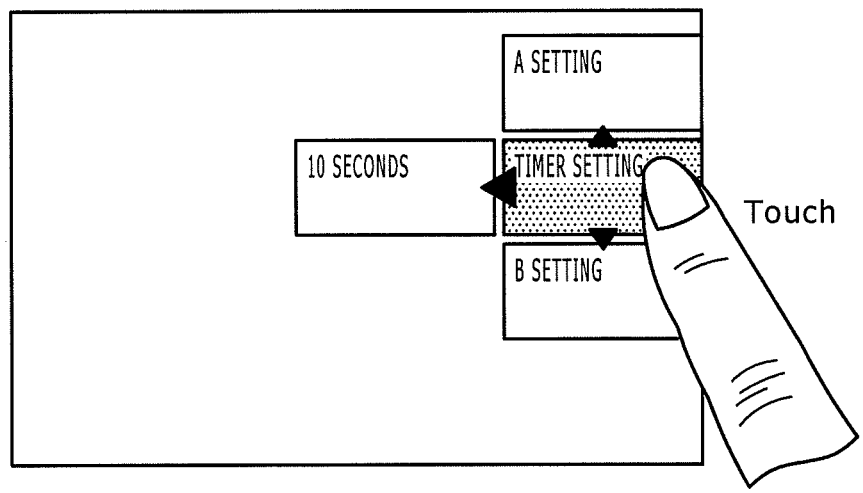
FIGS. 19 and 20 are schematic views illustrating different examples wherein a contacting operation is carried out midway of an approaching operation.
Figure 20:
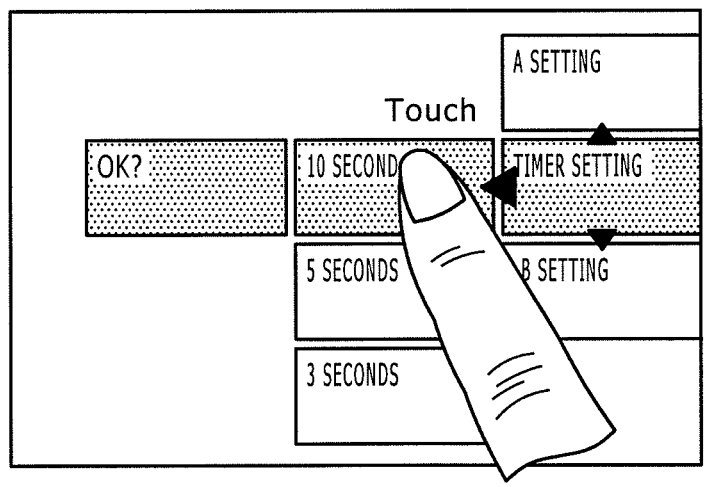

For example, FIGS. 19 and 20 illustrate examples of an operation for a list including three different function objects. Referring to FIGS. 19 and 20, this list of function objects particularly includes a function object relating to an A setting, a function object relating to a Timer setting and a function object relating to a B setting. If the Timer setting is pointed to, then choice objects representative of 10 seconds, five seconds and three seconds which are choices relating to the Timer setting are displayed. Then, if one of the choice objects is pointed to, then an execution object corresponding to the pointed object is displayed.

If a finger F is positioned in the selection region of the execution object in such a list of function objects as described above, then an execution process of a corresponding function is carried out usually. However, a contacting operation may be carried out during a non-contacting operation so that a later non-contacting operation may be omitted.

For example, by carrying out a contacting operation for the function object relating to the Timer setting in the list of function objects described above, a period of 10 seconds set as a default value for the Timer setting in advance may be set as seen in FIG. 19. Or, if the function object relating to the Timer setting is pointed to and a choice object is displayed and then a contacting operation with the choice object representative of 10 seconds is carried out in place of pointing to of an execution object as seen in FIG. 20, then 10 seconds may be set as a set value of the Timer setting.

Further, position information of the finger F detected by the detection unit 114 may include information of the distance between the operation screen and the finger as an operating body. The distance information can be utilized also, for example, for display control of an object.

For example, the control section 120 may control the display size of an object in response to the distance between the finger F and the operation screen detected by the detection unit 114 as seen in FIG. 21. At this time, the control section 120 may control the display size of the object such that, as the distance between the operation screen and the finger F increases, the display size increases.

In the case where the distance between the finger F and the operation screen is short like a distance h2, it is easy to point to a desired point on the operation screen by means of the finger F. However, in the case where the distance between the finger F and the operation screen is great like a distance h1, it is difficult to point to a desired point on the operation screen by means of the finger F in comparison with the alternative case where the distance is small. Therefore, occurrence of malfunction can be reduced by increasing the display size of an object which is to make an operation target.

While a preferred embodiment of the present disclosure has been described above with reference to the accompanying drawings, the present disclosure is not limited to the embodiment. It is apparent that a person skilled in the art could have made various alterations or modifications without departing from the spirit and scope of the disclosure as defined in claims, and it is understood that also such alterations and modifications naturally fall within the technical scope of the present disclosure.

For example, while the information processing apparatus 100 in the embodiment described hereinabove can input operation information in a non-contacting state by means of a proximity touch sensor, the disclosure is not restricted to this example. The information processing apparatus may be an apparatus which uses any other pointing device. For example, the information processing apparatus may be an apparatus which operates in response to operation information of a mouse or a contact type touch screen. Or, the information processing apparatus may be an apparatus having a function of detecting operation information for an operation screen displayed by irradiation of a projector. For example, the information processing apparatus can be implemented by an apparatus which acquires operation information by analyzing a picked up image on an operation screen.

It is to be noted that, in the present specification, the steps described in the flow charts may be but need not necessarily be processed in a time series in the order as described, and include processes which are executed in parallel or individually without being processed in a time series. Further, it is a matter of course that even the steps processed in a time series can be executed in a suitably changed order as occasion demands.

The present disclosure contains subject matter related to that disclosed in Japanese Priority Patent Application JP 2010-175636 filed in the Japan Patent Office on Aug. 4, 2010, the entire content of which is hereby incorporated by reference.

What is claimed is:

1. An electronic device, the device comprising a processor configured to:
   determine whether an operation member points to a first selection region corresponding to a first selection object;
   control a display to display at least one second selection object near to the first selection object when it is determined that the member points to the first selection region, wherein said at least one second selection object is at least one selectable menu object wherein each one of said at least one selectable menu object is associated with a user input command associated with the first selection object;
   detect a motion of the member; and
   determine a direction of the detected motion,
   wherein the processor selects said at least one second selection object based on the determined direction, and wherein said at least one second selection object is selected when the operating member is detected to no longer point to both the first selection object and said at least one second selection object which is being selected.

2. The device as recited in claim 1, wherein the interface is further configured to initiate execution of a process by the processor when it is determined that the member points to a second selection region corresponding to said at least one second selection object.

3. The device as recited in claim 1, wherein the first selection object is a function selection object.

4. The device as recited in claim 1, wherein said at least one second selection object is one of a guidance selection object or an execution selection object.

5. The device as recited in claim 1, wherein the interface is further configured to consecutively display a plurality of said at least one second selection objects corresponding to a plurality of second selection regions.

6. The device as recited in claim 5, wherein the interface is further configured to erase the plurality of said at least one second selection objects, the speed of erasing the plurality of said at least one second selection objects being slower than a speed of displaying the plurality of said at least one second selection objects.

7. The device as recited in claim 1, wherein the interface is further configured to:
display a plurality of first selection objects in an alignment; and
display said at least one second selection object based on the alignment.

8. The device as recited in claim 7, wherein said at least one second selection object is displayed perpendicular to the alignment.

9. The device as recited in claim 1, wherein the interface is configured to:
detect contact with the operation member; and
initiate execution of a process by the processor based on the detected contact.

10. The device as recited in claim 9, wherein the interface is configured to initiate execution of a process by the processor based on the detected contact prior to initiating execution of a process by the processor based on a non-contact proximity.

11. The device as recited in claim 1, wherein the interface is configured to detect non-contact proximity of the operation member.

12. The device as recited in claim 11, wherein the interface is configured to determine a change in proximity of the operation member with respect to the interface.

13. The device as recited in claim 12, wherein the interface is configured to initiate a first process upon detection of an increase in proximity and a second process upon detection of a decrease in proximity.

14. The device as recited in claim 12, wherein the interface is configured to initiate a process upon detection of a change in proximity, the process comprising a change in the size of one or more selection objects.

15. The device as recited in claim 12, wherein the interface is configured to initiate a process upon detection of a decrease in proximity, the process comprising erasing, from the display, one or more selection objects.

16. The device as recited in claim 1, wherein the interface is configured to display the at least one second selection object adjacent to the first selection object when it is determined that the member points to the first selection region.

17. The electronic device of claim 1, wherein:
the device comprises the display;
the display comprises an LCD display;
the device comprises an input interface; and
the input interface is a touch panel.

18. The electronic device of claim 1, wherein the at least one second selection object is selected when the operating member moves away from the first selection object in a direction opposite to the relative position of the to be selected second selection object of the at least one second selection object in relation to the first selection object in order to avoid the operating member from visually obstructing view of the selected second selection object.

19. A computer-implemented method, the method comprising:
detecting proximity of an operation member;
determining whether the member points to a first selection region corresponding to a displayed first selection object;
displaying at least one second selection object near to the first selection object when it is determined that the member points to the first selection region, wherein said at least one second selection object is at least one selectable menu object wherein each one of said at least one selectable menu object is associated with a user input command associated with the first selection object;
detecting a motion of the member;
determining a direction of the detected motion; and
selecting the at least one second selection object based on the determined direction, wherein said at least one second selection object is selected when the operating member is detected to no longer point to both the first selection object and said at least one second selection object which is being selected.

20. The method as recited in claim 19, wherein said proximity comprises non-contact proximity.

21. A tangibly embodied computer-readable storage medium including instructions that, when executed by a processor, perform a method comprising:
detecting proximity of an operation member;
determining whether the member points to a first selection region corresponding to a displayed first selection object;
displaying at least one second selection object near to the first selection object when it is determined that the member points to the first selection region, wherein said at least one second selection object is at least one selectable menu object wherein each one of said at least one selectable menu object is associated with a user input command associated with the first selection object;
detecting a motion of the member;
determining a direction of the detected motion; and
selecting the at least one second selection object based on the determined direction, wherein said at least one second selection object is selected when the operating member is detected to no longer point to both the first selection object and said at least one second selection object which is being selected.

22. The method as recited in claim 21, wherein said proximity comprises non-contact proximity.

* * * * *